United States Patent [19]
Cassetta et al.

[11] Patent Number: 5,780,091
[45] Date of Patent: Jul. 14, 1998

[54] MULTI LAYER SPIRAL-SHAPED, DRIED PASTA/SAUCE FOOD COMPOSITION AND A METHOD FOR MAKING THE SPIRAL PASTA/SAUCE COMBINATION

[75] Inventors: James Vincent Cassetta, Pearl River, N.Y.; Michael Budd, Lincoln Park; Mauro Dominick Mordini, Parsipany, both of N.J.

[73] Assignee: Thomas J. Lipton Co., Division of Conopco, Inc., Englewood Cliffs, N.J.

[21] Appl. No.: 556,356

[22] Filed: Nov. 13, 1995

[51] Int. Cl.$^6$ .................................................. A23L 1/16
[52] U.S. Cl. .................... 126/557; 126/89; 126/94; 126/128; 126/289; 126/296; 126/451; 126/500
[58] Field of Search ...................... 426/557, 451, 426/89, 94, 128, 289, 296, 500, 517, 523

[56] References Cited

U.S. PATENT DOCUMENTS

| | | |
|---|---|---|
| 2,352,617 | 7/1944 | Cohen et al. |
| 2,357,585 | 9/1944 | Galvin et al. |
| 2,383,774 | 8/1945 | Cohen et al. |
| 2,576,670 | 11/1951 | Cohen |
| 3,615,597 | 10/1971 | Durst |
| 3,798,343 | 3/1974 | Vitale |
| 4,323,585 | 4/1982 | Manser |
| 4,394,397 | 7/1983 | Lometillo et al. ............ 426/557 |
| 4,515,817 | 5/1985 | Pavan ........................... 426/557 |
| 4,847,098 | 7/1989 | Langler |
| 4,853,236 | 8/1989 | Langler |
| 4,882,175 | 11/1989 | Ream et al. |
| 4,976,982 | 12/1990 | Gillmore et al. ............ 426/557 |
| 4,988,528 | 1/1991 | Tomoda |
| 5,139,808 | 8/1992 | Barnes et al. ............... 426/557 |
| 5,186,969 | 2/1993 | Jor |
| 5,358,727 | 10/1994 | Yates et al. |
| 5,410,857 | 5/1995 | Utley |
| 5,436,015 | 7/1995 | Patterson et al. .......... 426/557 |
| 5,514,397 | 5/1996 | Shapiro ....................... 426/557 |
| 5,534,273 | 7/1996 | Ito et al. ..................... 426/557 |

FOREIGN PATENT DOCUMENTS 1594713  8/1981  United Kingdom.

OTHER PUBLICATIONS

Hummel, C., "Chapter 3—Ingredients Used in the Manufacture of Macaroni Products", *Macaroni Products, Manufacture, Processing and Packaging*, London, Food Trade Press Ltd., (1966) pp. 15–21.

Hummel, C., *Macaroni Products, Manufacture, Processing and Packaging* London, Food Trade Press Ltd., (1966) pp. 1–6.

Baroni, D., "Chapter 10—Manufacture of Pasta Products", *Macaroni Products, Manufacture, Processing and Packaging*, by Dr. Charles Hummel, London, Food Trade Press Ltd., (1966) pp. 191–203.

*Primary Examiner*—Lien Tran
*Attorney, Agent, or Firm*—James J. Farrell

[57] ABSTRACT

A spiral wound instant pasta solid sauce composite noodle is disclosed which employs selected dusting agents and solid sauce interleaved within the spiral to insure unrolling of the spiral upon subsequent boiling. A method for the preparation of the sauce and the noodle is also disclosed along with a system for packing the noodles in flexible envelopes to reduce breakage of the noodles and to permit inclusion of noodles longer than the flexible package filling aperture and reducing the incidence of perforation of the package.

5 Claims, 2 Drawing Sheets

1

MULTI LAYER SPIRAL-SHAPED, DRIED PASTA/SAUCE FOOD COMPOSITION AND A METHOD FOR MAKING THE SPIRAL PASTA/SAUCE COMBINATION

BACKGROUND OF THE INVENTION

1. Field of the Invention

This invention relates to novel shapes of instant pasta noodles interleaved with solidified sauces and methods for preparing the sauces and the noodles together with additives which when added to the pasta allow it to be prepared in the novel shapes but still permit it to separate upon cooking, for example, boiling.

2. Description of the Art

The use of grains, particularly farinaceous-based grains, to prepare cooked products has been in existence for many years, perhaps as early as the first century A.D. Over the years there have been many methods for making such farinaceous products and for making such products in various shapes. Traditionally these pasta noodles are served with additional condiments such as butter, tomato sauce and the like. These condiments or sauces or gravy are traditionally fluid at room temperature and flow easily over the pasta.

The pasta portion with which this invention is concerned are mainly pasta products prepared from semolina which is preferably the main raw material used in their manufacture. This is milled from hard wheat and preferably the semolina is milled from durum wheat. There are many references to obtaining and preparing semolina wheat flour, one of which is in Chapter 3, entitled "Ingredients Used in the Manufacture of Macaroni Products" pp. 15–21 from a book entitled *Macaroni Products, Manufacture, Processing and Packaging* by Dr. Charles Hummel, 1966, London, Food Trade Press Ltd. There are also many varied shapes of pasta which are prepared and this is also mentioned in the introduction of the book on macaroni products by Dr. Charles Hummel, pp. 1–6 above. Some of the pasta is made into nests and skeins and this is mentioned in chapter 10 entitled "Manufacture of Pasta Products", by Dante Baroni, pp. 191–203 from Hummel's book above. In essence, these noodles are prepared to be cooked in a cooking pot containing boiling water and the like and served.

U.S. Pat. No. 4,323,585 relates to a process for producing pasta products in serving portions in packages. This patent refers to nests and other pasta products packed on the basis of eating portions.

U.S. Pat. No. 3,798,343 relates to a process for preparing frozen rolled lasagna. Generally the process used is one where cheese and meat are applied to one face of the single noodle which is then rolled in a spiral and frozen.

U.S. Pat. No. 4,988,528 relates to preparing instant noodles adapted to be cooked in boiling water or the like and then served. This patent particularly relates to fried noodles.

Although many ways of preparing pasta are known, and although many shapes are available, in the art of preparing noodles for instant dishes which noodles are then contained in flexible packaging, for instance, it is difficult to obtain long noodles which can fit within the package since the package is relatively short. Thus, there is a need for a noodle shape which will allow placement into a package of relatively short dimensions. In addition, perforation of the packages can result from the sharp corners of cut noodles.

Spiral shapes are well known, for example, U.S. Pat. No. 4,882,175 employs a rolled tape of a confectionery such as bubble gum. In addition, in the baking industry several patents deal with preparing dough in a rolled spiral form such as, for example, U.S. Pat. No. 2,352,617. Instant noodles, however, present completely different problems from preparing dough into a cinnamon bun shape or into rolls of bubble gum. This is so principally because the pasta first must be prepared and precooked to a certain degree, then spiral rolled, then packed into relatively flexible packaging and when cooked, it must be capable of unrolling to its original length without sticking together. Thus, simply rolling pasta into a spiral formation would not permit unrolling upon cooking. The noodles would stick together in a disc and not unroll. If a solidified sauce were interleaved with the pasta, however, this would substantially permit the cooking pasta to unroll.

Various foodstuffs have been pureed and then slurried and reformed into solids such as fruit leathers or fruit rolls and the like disclosed in U.S. Pat. No. 5,358,727 and U.S. Pat. No. 4,417,405, as well as solid condiments such as those disclosed in U.S. Pat. No. 3,615,597 and dual textured foods such as disclosed in U.S. Pat. No. 4,847,098 and U.S. Pat. No. 4,853,236.

Conventional instant noodles are manufactured by preparing a dough which is then formed into a strip by multistage rolls. The strip is steamed to partially cook it, gelatinize it and improve its elasticity. It is then cut in the longitudinal direction and subsequently chopped to the appropriate length, dried, and introduced into an appropriate package either alone or with other materials to constitute instant noodles or for example, instant soup.

The instant noodles or instant soup is then, when ready for consumption, admixed with hot water or boiled until cooking is completed.

SUMMARY OF THE INVENTION

Spiral wound pasta noodle units are prepared containing an interleaved substantially solid sauce which assists in enabling separation into at least one long strand of pasta at least partially covered with sauce when subjected to boiling temperatures. This is accomplished in part by having an anti-sticking agent incorporated into the pasta composition and a dusting agent dusted onto the surface of the noodle before rolling and in part by interleaving with the solidified sauce. Both components assist in substantially preventing sticking together of the spiral.

Figure 1:
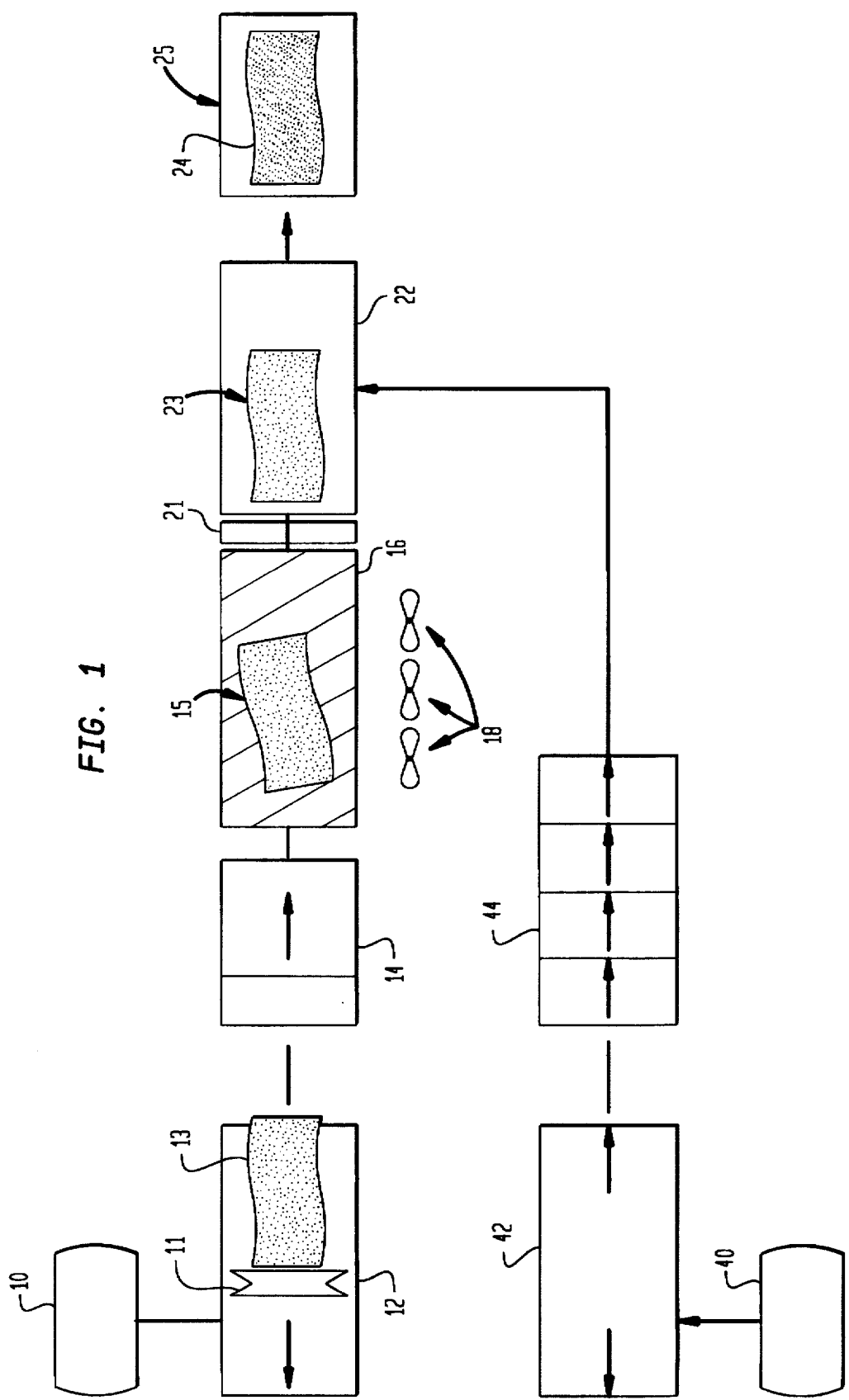
FIG. 1 shows the general scheme for forming the pasta/sauce composite.

DESCRIPTION OF THE DRAWINGS:

In FIG. 1 the dough is mixed in mixer 10 and then transferred to roller/sheeter 12 such as a Rondo® Sheeter to achieve a workable thickness and texture. The dough is dusted with a dusting agent from dusting trough 11. The worked dough 13 is then steamed in the steam tunnel 14 and the partially cooked dough 15 continues on the conveyor belt 16 past a battery of fans 18 to facilitate drying. The partially dried dough is then dusted again with the dusting component from the dusting trough 21. The dusted dough 23 is then introduced to a conveyor 22.

The sauce components are added and mixed in mixer 40 then transferred to a press/extruder 42 to achieve a workable thickness and texture. The worked sauce is then dried in dryer 44. The dried sauce is then routed to conveyor 22 and interleaved with the dusted dough 23 to form dusted sandwich sheet 24 which continues on conveyor 25.

Figure 2:
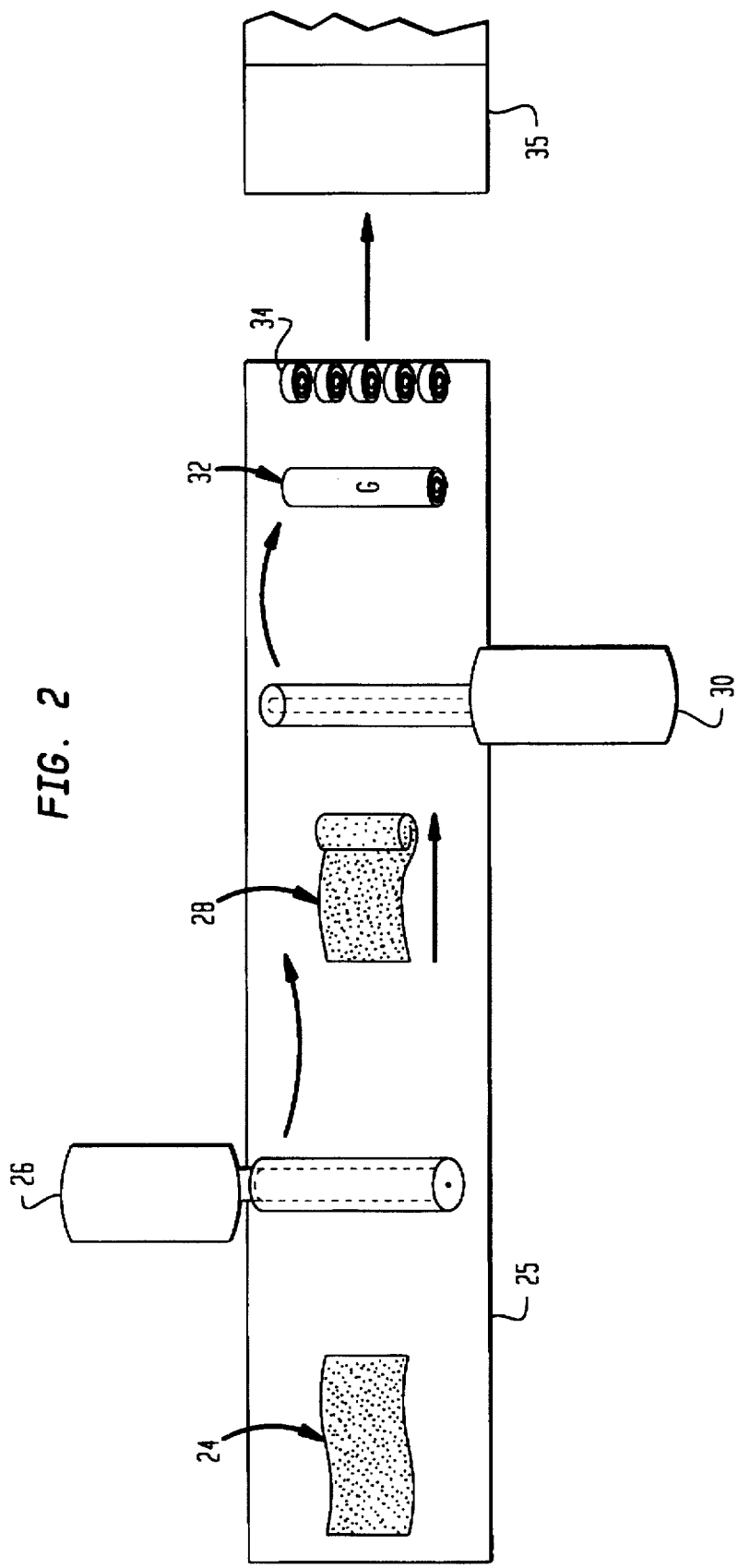
FIG. 2 is a continuing scheme of FIG. 1 for forming the pasta/sauce composite into spiral configuration.

In FIG. 2 the dusted sandwich sheet 24 is partially rolled by means known in the art through a variable speed roller 26 and then the half rolled sheet 28 contacts a finishing roller 30 to form the fully rolled sandwich sheet 32. The fully rolled sheet is then cut into individual spiral rolled units 34 by means known in the art. The individual composite pasta/sauce spiral roll units 34 are then dried in dryer 35.

DESCRIPTION OF THE PREFERRED EMBODIMENT

The pasta spirals are fabricated by first preparing a dough in a mixer, for example, a Hobart mixer. The dough in turn is formulated by first dry mixing for about five minutes, preferably Durum Semolina flour with an appropriate amount of soy fiber and a glycerol monostearate dough conditioner anti-sticking agent such as Myvaplex® 600. Mixing allows the ingredients to disperse evenly in the mix and form a useful dough. Addition of the Myvaplex® 600 dough conditioner helps the dough not to stick to the rolls when subsequently rolled and sheeted.

To this dry mixture is added a sufficient amount of water at ambient temperature to prepare the dough having a moisture content of about 35% and mixing is continued for another six to ten minutes.

The dough thus formed is removed and run through a series of rolls, for example, a Rondo® sheeter. The thickness of the dough is reduced to a product thickness of about 55 to 65 thousandths of an inch. This rolling or sheeting helps to work the dough to a functional texture and thickness and to develop wheat protein gluten if wheat is used. Generally the thickness of the dough will be sufficient so that it can be further worked without ripping or tearing it.

The worked dough is then steam cooked for about three minutes at about 8 psi steam pressure in a belt steam tunnel. The temperature is about 205° F.–212° F. This pre-gelatinizes the pasta starch and is necessary for instant noodles. Full cooking is not required as further cooking will be done when the noodles are used in an instant or "quick cooking" manner. Steaming will also reduce the stickiness of the product. This steam pre-gelatinization gives firmer texture, gives the pasta the ability to withstand longer cooking conditions, the ability to retain texture for longer periods after cooking, helps the product to resist checking during drying, and allows quicker cooking ability. It also forms a better starch matrix in the pasta. Partially drying the partially cooked dough to obtain a moisture content of about 15–25%.

The partially cooked or steamed dough coming out of the steam tunnel is then sprinkled with a light dusting of a fibrous dusting agent such as soy protein at a level of about 0.1% to 1.00% by weight of the soy protein to the wet dough. This dusting promotes separation and unwinding of the pasta spiral during the final cooking process. In addition, on its application to the sheet after steaming it assists in preventing the rolled layers from sticking together.

The solidified sauce, gravy or condiment is prepared by slurrying the selected ingredients in water, drying the slurry to a moisture content of about 10% to 20% to form a malleable sauce matrix then rolling the matrix to establish a consistency and thickness suitable for interleaving with the spiral pasta. The solidified sauce or gravy can also be used alone if desired but has particular application with the spiral rolled pasta of this invention.

Once the sauce is formed into malleable sheets it is then interleaved with the pasta dough. The sauce assists in enabling the spirals to unroll without sticking. Accordingly, the dusting, although preferable, is not required when a sauce is interleaved in the spiral.

The interleaved dough/sauce combination is then dried to a moisture content of about 20% to 25%. The dried dough combination is then cut to appropriate lengths and rolled up on itself by methods well known in the art such as those shown in U.S. Pat. Nos. 2,352,617; 2,383,774 or 2,576,670 and cut into appropriate widths to make spiral noodle compositions of a specified length. The noodles can be cut into selected widths by, for example, the methods shown in U.K. Patent No. 1,594,713. After cutting, the spiral wound noodles, are dried at 120° F. dry bulb and 100° F. wet bulb which reflexts a relative humidity of 49%. Drying takes place for 6–7 hours to a moisture of about 12% to 14%. Drying allows for long term storage. Some shrinkage of the spiral, leaving spaces between layers, occurs. This also allows for better separation during the cooking process.

The pasta/sauce combination is packed in flexible packages in which breakage of the pasta is reduced. The pasta has an uncoiled length that is equal to or greater than the filling size opening of the flexible packages.

Anti-sticking Agent

The anti-sticking or dough conditioning agent mixed into the dough can be any compound which operates to reduce or substantially prevent sticking of dough to the rollers used to work the dough. Various materials are appropriate and include glycerol monostearate such as the Myvaplex® 600 series obtainable from Eastman Chemical Products. Commercial, food grade glyceryl monostearate, also known as monostearin, is a mixture of variable proportions of glyceryl monostearate ($C_{21}H_{42}O_4$, CAS Reg. No. 31566-31-1), glyceryl monopalmitate ($C_{19}H_{38}O_4$, CAS Reg. No. 26657-96-5) and glyceryl esters of fatty acids present in commercial stearic acid. Glyceryl monostearate is prepared by glycerolysis of certain fats or oils that are derived from edible sources or by esterification, with glycerin, of stearic acid that is derived from edible sources. The most prevalent fatty acids include lauric, linoleic, myristic, oleic, palmitic, and stearic. Mono- and diglycerides are manufactured by the reaction of glycerin with fatty acids or the reaction of glycerin with triglycerides in the presence of an alkaline catalyst. The products are further purified to obtain a mixture of glycerides, free fatty acids, and free glycerin that contains at least 90 percent by weight glycerides.

Dusting Agent

The dusting agent is preferably incorporated into the pasta dough as well as dusted on the surface. When used it is preferably soy fiber such as FIBRIM® brand soy fiber obtainable from Protein Technologies International. This material is a mixture of structured polysaccharides and includes cellulosic and non-cellulosic carbohydrates.

Cellulose is a principal component of plant structural polysaccharides and is the only true fibrous component of the plant cell wall containing principally alpha ($\alpha$) cellulose.

The non-cellulosic structural polysaccharides are generally referred to as hemicelluloses, which consist of branched or linear polymers of D-xylose, D-galactose, D-mannose, L-arabinose, and L-rhamnose. Hemicelluloses are an integral part of the basic cellulose structure and contribute plastic properties in the cell wall. Unlike $\alpha$-cellulose, hemicelluloses are not crystalline in nature and typically have a higher water-holding capacity.

In addition, other dusting agents are useful such as oat bran and corn bran. Generally, the dusting agents are employed to insure that the pasta spirals unroll upon cooking. Fibrim® 1000 and 1450, as well as corn bran and selected starches may also be used.

Flour

The flour employed to prepare the pasta may be any grain flour and these flours are well known and may be selected from a variety of grains. Semolina wheat flour produced from Durum of a very fine grade is preferably used.

Sauce

The sauce generally combines the ingredients together in a mixer such as a Stephan processor or indeed any other convenient mixer. Preferably, mixing is accomplished under relatively high speed and high shear. The temperature of mixing varies between about 10° C. to 100° C. depending on the ingredients and is preferably at 15° C. to 30° C. or at ambient temperature.

The material is thoroughly mixed and then can be dried to a dough-like consistency having a water content sufficiently low to allow rolling or other type of working to prepare a relatively flat sheet with a good, workable texture which will still melt at 140° F. or above. The material can also be dried to a water content of about 10% to 20%, preferably less than 17%, and then extruded under pressure or pressed into a suitable flat sheet.

When the solidified sauce is employed with the spiral pasta of the invention, the solid sauce should have a water activity of less than about 0.5 to avoid microbiological difficulties. The type of materials contained may vary widely and include virtually any foodstuff.

It is essential that the materials are mixed in a thorough manner in a fluid or liquid medium, water being the most convenient medium but others may be used so long as they are biologically suitable for making foodstuffs for consumption.

The essential components are a dispersing liquid preferably water, flavors and other foodstuffs, and a water binding agent. The flavors may be any edible materials. The water binding agent can be any suitable agent such as gums, for example, xanthan and the like or starches or modified starches such as Ultrasperse® M from National Starch and Chemical Co. as well as other typical food grade water binding agents such as maltodextrins and the like.

Having generally described various aspects of the present invention, the invention will now be more particularly described with reference to the following specific examples.

The following examples are designed to illustrate, but not to limit, the practice of the instant invention. Unless otherwise indicated, all percentages are by weight.

EXAMPLE 1

2 lb. 8 oz. of semolina are mixed in a Hobart mixer with ½ qt. of water; 22 g. of glycerol monostearate (GMS) Myvaplex® 600 and 17 g. of soy fiber Fibrim® 1450.

The material, after mixing, is sheeted on a Rondo® Sheeter and dusted with Fibrim 1450. The sheeted dough is then steamed for three minutes at 8 lbs. pressure. The surface is dried with fans for five minutes and again dusted with Fibrim 1450 soy fiber. At this point the solidified sauce prepared as described below is sandwiched onto the pasta. Then by using a conveyor table setup with a rolling torpedo rod the pasta/sauce sandwich sheets are rolled onto themselves. The setting of the conveyor speed along with the position of the rolling torpedo, in various angles will create and determine the size and layer spacing of the sandwich roll. A cutting process follows in timed intervals with the progression of the roll off the torpedo rod. This gives equally sized cuts.

EXAMPLE 2

As in Example 1, a dough composition is prepared. The dough is mixed in a Hobart mixer then sheeted on a Rondo® sheeter but not sprinkled with any dusting agent. It is then sandwiched with solid sauce as described below and rolled and dried. The dried pasta/sauce combination upon boiling separates.

EXAMPLE 3

Evaluation of pasta/sauce sandwich with oat fiber and corn bran as dusting agents.

The pasta is mixed as in Example 1 using 1% oat fiber in the dough formulation. The dough is mixed, sheeted, steamed and rolled. Oat fiber and corn bran are used as dusting aids in sheeting, additional fiber is added after steaming. The solid sauce layer as described below is then added and the sandwich combination is rolled as in Example 1. The dried product is then boiled and observed for unrolling and sauce coverage.

Oat fiber and corn bran are equally efficient as a dusting aid. They disperse well and do not appear to leave any grainy mouthfeel after boiling. They seem to create a fibrous matrix and texture to the noodle and maintains a hard "al dente" type texture after increased cooking time. The sauce component melts easily in the boiling stage and will be consumer acceptable.

EXAMPLE 4

Solid Sauce Bar-B-Que Flavor

| INGREDIENT | GRAM WT. | % |
|---|---|---|
| Sucrose | 25.00 | 11.01 |
| Flavoring Agents | 14.00 | 6.17 |
| Brown sugar | 20.00 | 8.81 |
| Corn syrup solids | 50.00 | 22.02 |
| Water | 30.00 | 13.21 |
| Soybean oil | 12.00 | 5.28 |
| Ultrasperse ® M | 3.00 | 1.32 |
| Onion powder | 13.00 | 5.72 |
| Tomato paste | 45.00 | 19.82 |
| Citric acid | 2.00 | 0.88 |
| Salt | 5.00 | 2.20 |
| Worstershire Sauce Powder | 8.00 | 3.52 |
|  | 227.00 | 100.00 |

This formula resulted in a good flavor profile and functionality. The composition is extruded to a flat sheet of about 50 to 65 thousandths of an inch and dried to about 20% water. The composition is interleaved with the steamed pasta sheet as prepared in Example 1, rolled, cut and the composite is then dried to about 12% to 14% moisture. The composite easily separates upon boiling, the sauce melts and the product is consumer acceptable.

EXAMPLE 5

Solid Sauce Honey Flavor

| INGREDIENT | GRAM WT. | % |
|---|---|---|
| Sucrose | 25.00 | 11.46 |
| Maltodextrin | 50.00 | 22.93 |
| Water | 30.00 | 13.76 |

-continued

| INGREDIENT | GRAM WT. | % |
|---|---|---|
| Ultrasperse ® M | 4.00 | 1.83 |
| Salt | 5.00 | 2.29 |
| Flavoring agents | 27.00 | 12.38 |
| Dijon Mustard | 17.00 | 7.79 |
| Brown sugar | 20.00 | 9.17 |
| Honey | 30.00 | 13.76 |
| Soybean oil | 10.00 | 4.58 |
| | 218.00 | 100.00 |

The solid sauce is pressed and dried to a solid consistency with a moisture of 17%. This can then be sandwiched with a pasta roll to form a composite product.

EXAMPLE 6

The following ingredients are mixed together in a Hobart bowl to form a "dough". Wet ingredients are mixed first then added to the dry ingredients.

| Ingredients | Parts by Weight |
|---|---|
| Sugar | 25 |
| Brown sugar | 20 |
| Corn syrup solids | 55 |
| Water | 20 |
| Flavoring agents | 11 |
| Soybean oil | 10 |
| Ultrasperse ® M | 14 |
| Tomato paste | 35 |

30 gram balls are weighed out and pressed in a pneumatic press at 80 psi to form a solid sauce. This sauce is then dried overnight at room temperature to a moisture of 17%; and when interleaved with pasta forms a composite pasta roll.

EXAMPLE 7

Savory Solid Sauce

| | Parts by Weight |
|---|---|
| Water | 10.0 |
| Sucrose | 35.0 |
| Salt fine | 6.0 |
| Flavoring Agents | 2.0 |
| Bakers honey | 20.0 |
| Granulated Brown Sugar | 25.0 |
| Dijon mustard | 60.0 |
| Ultrasperse M. National | 15.0 |
| Mustard seeds, cracked | 5.0 |
| Corn syrup Dri sweet 42C | 60.0 |

The composition is mixed, extruded, dried and interleaved with a steamed pasta sheet as prepared in Example 1. The composite is then rolled into a spiral and dried. When boiled the composite will separate easily and the sauce/pasta combination will be organoleptically suitable.

EXAMPLE 8

Tomato Rolls with Seasoning

Three variables are prepared.
1. Tomato/Basil
(87%) 1 lb. tomato paste
(13%) 0.12 lb. preserved basil 2. Tomato/garlic
(87%) 1 lb. tomato paste
(13%) 0.114 lb. garlic—chopped
3. Tomato/garlic/basil
(87%) 1 lb. tomato paste
(6.5%) 0.065 lb. basil
(6.5%) 0.065 lb. garlic All products are pressed and set to dry at room temperature/humidity. They produce dried products suitable for interleaving with pasta.

EXAMPLE 9

Tomato Rolls with Crushed and Diced Tomato

Three formulas are made with the following composition:

| | Formula I | |
|---|---|---|
| Tomato Paste | 906 grams | 66% |
| Tomato Diced in Puree | 453 grams | 33% |
| | 1359 grams | 100% |
| | Formula II | |
| Tomato Paste | 992 grams | 70% |
| Tomato Diced in Puree | 435 grams | 30% |
| | 1427 grams | 100% |
| | Formula III | |
| Tomato Paste | 1812 grams | 73% |
| Tomato Diced in Puree | 679.5 grams | 27% |
| | 2491.5 grams | 100% |

Each formula is mixed in a Stephan processor. One minute of shear is applied with high speed and the high shear blade.

The Ingredients are at 70° F. before processing and 71° F. after processing. The materials are pressed and then dried at room temperature and humidity for 24 hours. The sauce will melt above 140° F. and is suitable for interleaving with pasta spirals.

EXAMPLE 10

A pasta spiral prepared as in Example 1 and a sauce prepared as in Example 9 (Formula I) are interleaved and dried. The product is consumer acceptable.

This invention has been described with respect to certain preferred embodiments and various modifications and variations in the light thereof will be suggested to persons skilled in the art and are to be included within the spirit and purview of this application and the scope of the appended claims.

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A dried partially cooked instant pasta/sauce composition in the form of a closely wound, compacted spiral, said pasta composition consisting essentially of flour, an anti-sticking agent, water, and a dusting agent sprinkled on the surface of said pasta selected from the group consisting of oat bran, corn bran, soy fiber and oat fiber, said pasta composition further having said sauce consisting essentially of food ingredients, water and water binding agent interleaved within the spiral form so that upon subsequent boiling the spiral uncoils without substantially sticking together and the pasta is immersed in sauce or sauce diluted with the water used for boiling.

2. The pasta of claim 1 wherein said anti-sticking agent is glycerol monostearate.

3. The pasta of claim 1 wherein said dusting agent is soy fiber.

4. A process for producing a partially cooked instant pasta solid sauce composition in the form of a closely wound compacted two layer spiral comprising:

preparing a pasta dough by
- (i) dry blending a combination of fine durum semolina flour with an anti-sticking agent for about five minutes;
- (ii) adding water to achieve a raw dough moisture of about 35%;
- (iii) mixing the raw dough and sheeting, rolling or working the raw dough to achieve a functional thickness and texture;
- (iv) steaming the raw dough for about three minutes at a temperature of about 100° C. to partially cook the raw dough;
- (v) Partially drying the partially cooked dough to achieve a moisture content of about 15 to 25%;
- (vi) dusting the partially dried dough with about 0.1% to 1.0% by weight of soy fiber;
- (vii) placing a layer of the solid sauce on said pasta to form at least a two layer pasta solid sauce composite;
- (viii) rolling the composite to form a combination spiral of appropriate length;
- (ix) cutting the spirally rolled composite into separate noodle units of appropriate thickness;
- (x) drying the composite noodles to a moisture content of about 12-14%.

5. A method for reducing the breakage of relatively long instant noodles when packed in flexible packages and including a method for enabling the relatively long noodles to be so packed, said noodles having an uncoiled length equal to or greater than the filling size opening of the flexible package comprising:

preparing a pasta dough by
- (i) dry blending a combination of fine semolina flour with an antisticking agent for about five minutes;
- (ii) adding water to the combination to achieve a moisture content of about 35%;
- (iii) mixing the combination to form a raw dough;
- (iv) sheeting, rolling or working the raw dough to achieve a functional texture;
- (v) cooking the raw dough for about three minutes at a temperature of about 100° C. to pregelatinize the starch in the dough;
- (vi) partially drying the partially cooked dough to achieve a moisture content of about 15 to 25%;
- (vii) dusting the partially cooked dough with about 0.1% to 1.5% of a dusting agent selected from the group consisting of oat bran, corn bran, soy fiber and oat fiber;
- (viii) layering the partially cooked, dusted dough with a solid sauce composition to form at least a two layer pasta solid sauce composite;
- (ix) rolling the composite to form a spiral of appropriate length;
- (x) cutting the composite into an appropriate thickness;
- (xi) drying the cut composite to form a spiral instant pasta/sauce noodle;
- (xii) packing the composite noodles in a flexible package;
- (xiii) sealing the flexible package.

* * * * *